US012725369B2

(12) United States Patent
Muthuvalliappan et al.

(10) Patent No.: US 12,725,369 B2
(45) Date of Patent: Sep. 1, 2026

(54) SYSTEM AND METHOD FOR AUGMENTED REALITY-BASED MACHINE CONTROL TRAINING AND OPERATION

(71) Applicant: Caterpillar Inc., Peoria, IL (US)

(72) Inventors: Nachiappan Muthuvalliappan, Chennai (IN); Poornapragna Math, Hyderabad (IN)

(73) Assignee: Caterpillar Inc., Peoria, IL (US)

( * ) Notice: Subject to any disclaimer, the term of this patent is extended or adjusted under 35 U.S.C. 154(b) by 202 days.

(21) Appl. No.: 18/606,348

(22) Filed: Mar. 15, 2024

(65) Prior Publication Data

US 2025/0292516 A1 Sep. 18, 2025

(51) Int. Cl.

*G06T 19/00* (2011.01)
*G06Q 10/0639* (2023.01)
*G06V 40/20* (2022.01)

(52) U.S. Cl.

CPC ....... *G06T 19/006* (2013.01); *G06Q 10/0639* (2013.01); *G06V 40/20* (2022.01)

(58) Field of Classification Search

CPC .. G06T 19/006; G06Q 10/0639; G06V 40/20; G06V 20/20
See application file for complete search history.

(56) References Cited

U.S. PATENT DOCUMENTS

| | | | |
|---|---|---|---|
| 10,301,798 B2 | 5/2019 | France et al. | |
| 10,983,672 B2 | 4/2021 | Wagner et al. | |
| 11,475,606 B2 | 10/2022 | Terada et al. | |
| 12,340,709 B2 * | 6/2025 | Ramani | G06N 3/0464 |
| 2009/0182460 A1 * | 7/2009 | O'Neal | B60R 25/00 701/2 |
| 2017/0301261 A1 * | 10/2017 | Robitzkat | G09B 19/24 |
| 2019/0211532 A1 | 7/2019 | Sakamoto et al. | |
| 2019/0312774 A1 * | 10/2019 | Lehman | H04L 41/22 |
| 2020/0019819 A1 * | 1/2020 | Koushik Bangalore Suryanarayana | G06N 3/0464 |
| 2021/0372561 A1 * | 12/2021 | Swift | A41D 13/0002 |
| 2024/0339040 A1 * | 10/2024 | Ramani | G09B 5/02 |

FOREIGN PATENT DOCUMENTS

| | | |
|---|---|---|
| CN | 112017498 B | 11/2022 |
| JP | 2005057343 A | 3/2005 |
| KR | 102419428 B1 | 7/2022 |
| KR | 102565424 B1 | 8/2023 |

* cited by examiner

*Primary Examiner* — Grace Q Li

(57) ABSTRACT

In some implementations, a system may obtain image data associated with an environment of a machine. The system may determine, based on the image data, machine information associated with the machine, wherein the machine information includes at least one of a machine type, at least one control component depicted in the image data, or a control configuration. The system may obtain, based on the machine information, training content associated with the at least one control component. The system may generate, based on the training content, at least one AR element indicating functionality information corresponding to the at least one control component. The system may provide, for display or output and in association with a training module, the image data with the at least one AR element overlayed in the image data, and information associated with the at least one control component indicated by the training content.

20 Claims, 8 Drawing Sheets

SYSTEM AND METHOD FOR AUGMENTED REALITY-BASED MACHINE CONTROL TRAINING AND OPERATION

TECHNICAL FIELD

The present disclosure relates generally to machines and, more particularly, to a system and method for augmented reality (AR)-based machine control training and operation.

BACKGROUND

A machine may include one or more control components to enable an operator to control functions of the machine. For example, a machine may include a steering system that allows the machine to shift, lean, pivot, rotate, articulate, and/or otherwise move when stationary. A machine may include one or more implement systems that enable an operator to manipulate and/or move respective implements to relative to the machine. The steering system and the implement system may be manually controlled by an operator via a user interface or other control components included within an operator cab of the machine or from a remote work station. The one or more control components may include devices or components that enable the operator to control a steering function, an implement function, a propulsion function, a transmission function, and/or another function of the machine.

Machines often include a multitude of control components including display controls, joysticks, front dash controls, and post controls, among other examples. Each of the control components may have one or more functions and modes of operation, making it challenging to present all the functionalities to an operators. Additionally, different manufacturers may design control interfaces differently, leading to inconsistency in layout and functionality across machines. Operating a machine with insufficient training on the control components may increase the risk of damage to one or more components or implements of the machine due to improper operation.

In some examples, a device, e.g., a display screen in the machine or a user device, may display an operator manual for the machine, e.g., that provides information on the functionalities, capabilities, intended operation, unintended operation, and/or other information for the machine or control components of the machine. However, because of the multitude of control components included in the machine and the many functionalities supported by the machine, the displayed operator manual may include a significant amount of information, pages, and/or sections. Therefore, the device, e.g., displaying the operator manual, may consume significant processing resources, computing resources, memory resources, and/or power resources, among other examples associated with navigating through different pages or menus of the operator manual, generating different pages of the operator manual, and/or presenting information for display, among other examples, associated with an operator searching through the operator manual for information relevant to a given control component and/or function of the machine.

Further, it may be difficult for a user to locate particular information of interest using the operator manual. For example, descriptions of a navigational menu may be unintuitive and/or the operator may need to click through navigational menus in multiple hierarchical levels in order to locate the information of interest. The difficulty to locate particular information of interest using the operator manual may increase a likelihood that the operator is unable to obtain information regarding the correct or intended operation of a given control component and/or function of the machine. This may increase a risk of damage to the machine, an implement of the machine, and/or an environment around the machine, among other examples, due to improper operation of the machine and/or a function of the machine.

Additionally, it may be difficult to ensure that an operator has obtained the required information indicating the intended operation and/or the unintended operation of the control components and/or functions of the machine, e.g., to ensure that the operator has received proper training. For example, the operator manual may be provided for display via the device. However, the device and/or the machine may be unable to determine whether the operator viewed and/or obtained information relevant to a particular control component and/or function of the machine before the operator attempts to use the particular control component and/or perform the function using the actual machine. This may increase a risk of damage to the machine, an implement of the machine, and/or an environment around the machine, among other examples, due to improper operation of the machine and/or a function of the machine.

Korea Patent No. 102565424, hereinafter 'the '424 patent', discloses a safety training system and method for augmented reality-based construction equipment. The training system of the '424 patent includes receiving, by a training terminal, a construction site and construction equipment from training life through a construction equipment safety training application. The training system of the '424 patent includes superimposing, by the training terminal, a construction equipment object obtained by three-dimensional modeling the construction site and a construction equipment image obtained by three dimensional modeling the construction equipment. The training system of the '424 patent includes generating and displaying an augmented reality image of the construction equipment working at the construction site. However, the training system disclosed by the '424 patent does not provide effective presentation of relevant information for control components and/or functionality of a given machine. Additionally, the training system disclosed by the '424 patent does not disclose any manner of ensuring that an operator has obtained the required information indicating the intended operation and/or the unintended operation of the control components and/or functions of the machine.

The system of the present disclosure solves one or more of the problems set forth above and/or other problems in the art.

SUMMARY

A system for augmented reality (AR)-based machine control training and operation may include at least one processor; and at least one memory in communication with the processor, the at least one memory configured to store instructions thereon that, when executed by the at least one processor, configure the at least one processor: obtain, via a user device, image data associated with an environment of a machine; determine, using a machine learning model and based on the image data, machine information associated with the machine, wherein the machine information includes at least one of a machine type or at least one control component depicted in the image data; obtain, based on the machine information, training content associated with at least one of the machine or the at least one control component; generate, based on the training content, at least one AR element indicating functionality information corresponding to the at least one control component; provide, for display or output via the user device and in association with a training module, the image data with the at least one AR element overlayed in the image data, and information associated with the at least one control component indicated by the training content; and perform an action associated with enabling or disabling functionality of the machine based on at least one user interaction with the training module.

A method for AR-based machine control training and operation may include obtaining, by a system, image data associated with an environment of a machine; determining, by the system and based on the image data, machine information associated with the machine, wherein the machine information includes at least one of a machine type, at least one control component depicted in the image data, or a control configuration; obtaining, by the system and based on the machine information, training content associated with the at least one control component; generating, by the system and based on the training content, at least one AR element indicating functionality information corresponding to the at least one control component; and providing, by the system and for display or output and in association with a training module, the image data with the at least one AR element overlayed in the image data, and information associated with the at least one control component indicated by the training content.

A non-transitory computer-readable medium storing a set of instructions may include instructions that, when executed by at least one processor of a system, cause the system to: obtain, via a user device, image data associated with an environment of a machine; determine, using a machine learning model and based on the image data, machine information associated with the machine, wherein the machine information includes at least one of a machine type or at least one control component depicted in the image data; obtain, based on the machine information, training content associated with at least one of the machine or the at least one control component; generate, based on the training content, at least one AR element indicating functionality information corresponding to the at least one control component; provide, for display or output via the user device and in association with a training module, the image data with the at least one AR element overlayed in the image data, and information associated with the at least one control component indicated by the training content; and perform an action associated with enabling or disabling functionality of the machine based on at least one user interaction with the training module.

DETAILED DESCRIPTION

This disclosure relates to a training system, which is applicable to any machine that includes one or more control components. For example, the machine may be a vehicle, a compactor machine, a load-haul-dump (LHD) machine, a mining truck, e.g., an underground mining truck, an articulated truck, a material loader, e.g., a material handler, a material conveyer, a paving machine, a cold planer, a grading machine, a backhoe loader, a wheel loader, a harvester, an excavator, a motor grader, a skid steer loader, a tractor, a drill, a mining shovel, a forest machine, a pipelayer, a grading machine, and/or a dozer, among other examples.

Figure 1:
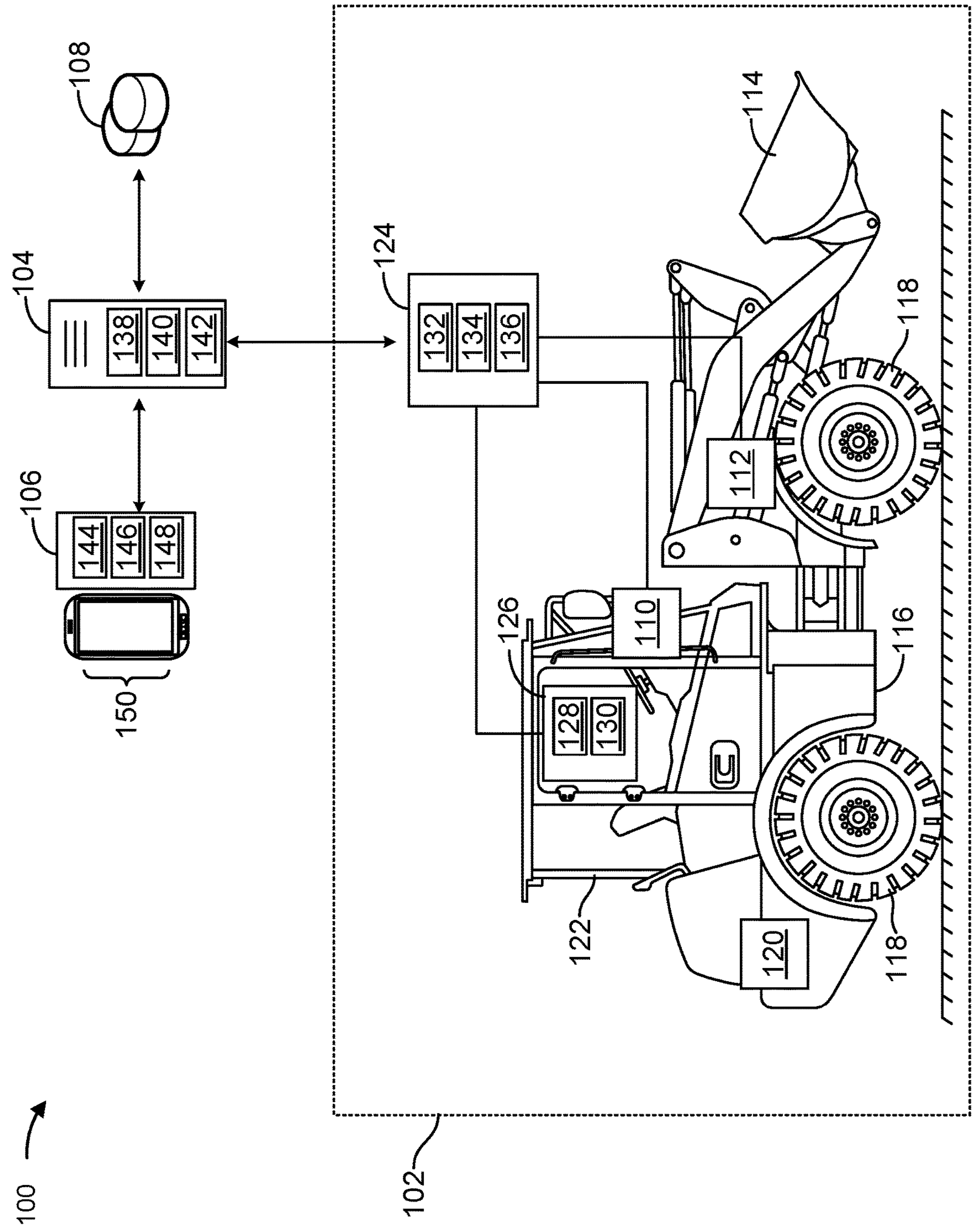
FIG. 1 is a diagram of an example system associated with augmented reality (AR)-based machine control training and operation described herein.

FIG. 1 is a diagram of an example system 100 associated with augmented reality (AR)-based machine control training and operation described herein. As shown in FIG. 1, the system 100 may include a machine 102, a training system 104, a user device 106, a storage device 108, and/or another device configured to facilitate operation of machine 102 within an associated worksite. The machine 102 may include one or more control components 110, such as a steering system that enables a steering function of machine 102, an implement system that enables an implement system 112 of machine 102, and/or another system that enables another function of machine 102.

Implement system 112 may enable an operator to operate an implement 114. The implement 114 may be a work tool. The implement 114 may include a bucket, a drill, a blade, a plow, a backhoe, a fork, a broom, a cold planer, a compactor, a hammer, a material handler, a mulcher, a saw, a grinder, and/or a trencher, among other examples. The system 100 may provide at least one AR element identifying control components and/or training content for given control components depicted via image data captured by the user device 106, as described in more detail elsewhere herein. Additionally, the system 100 may control access to operation and/or performance of one or more functions, and/or a use of one or more control components 110, of the machine 102 in accordance with an operator progress in one or more training modules, as described in more detail elsewhere herein.

In some implementations, the system 100 may include multiple machines 102 and/or multiple user devices 106 that interact with the training system 104 and/or the storage device 108. In some examples, the system 100 may include multiple training systems 104 and/or multiple storage devices 108 that interact with one or more machines 102 and/or one or more user devices 106. In some examples, the system 100 may be used with a semi-autonomously operated machine 102. For example, training system 104 and/or the user device 106 of the system 100 may be used to guide, navigate, and/or control a semi-autonomous machine 102 based on an operating condition of the machine 102, location data of machine 102, location data of another machine 102, coordinate data associated with a worksite or a facility associated with the machine 102, coordinate data associated with a target work path, and/or coordinate data associated with a target site plan, among other examples. In some examples, the machine 102 may receive guidance, navigation, and/or control information from a remote operator via the user device 106, from an operator local to machine 102, and/or from another device of the system 100.

As further shown in FIG. 1, the machine 102 includes a frame 116, traction elements 118, a propulsion system 120, an operator cab 122, and/or a control device 124. The one or more control components 110 may be included in and/or may communicate with the control device 124. The one or more control components may include a steering system that may be supported by the frame 116 and include an electro-hydraulic system, an electromechanical system, a hydromechanical system, and/or another system that enables the machine 102 and/or traction elements 118 to turn, lean, and/or otherwise perform a steering function directed by an operator, e.g., via an input to a control component 110. Additionally, or alternatively, the steering system may enable an articulation of the machine 102 to perform a steering function. The implement system 112 may be supported by frame 116 and include an electrohydraulic system, an electromechanical system, a hydromechanical system, and/or another system that enables the implement 114 to be operated and/or manipulated to perform an implement function directed by an operator, e.g., via an input to a control component 110. The traction elements 118 may include wheels, tracks, and/or other traction elements that are movably coupled to the frame 116 and caused to be driven by a propulsion system 120. The propulsion system 120 may include a diesel engine, a gasoline engine, a natural gas engine, a hybrid engine, an electric motor, and/or another power source configured to propel the machine 102.

The machine 102 may include the operator cab 122. The operator cab 122 includes an enclosure and/or another structure that is coupled to the frame 116 and configured to support an operator of the machine 102. The operator cab 122 may include the one or more control components 110. In some examples, the operator cab 122, and/or the one or more control component 110, may be located remote from the machine 102. For example, the machine 102 may be remotely controlled from the operation cab 122. The operator cab 122 may include a control dashboard 126. The control dashboard 126 may include one or more input devices 128 and/or one or more output devices 130. An input device 130 may include one or more of the control components 110, such as a brake control pedal, a torque control pedal, a throttle control pedal, a clutch pedal, a direction control switch, a steering control lever, an implement control lever, a control panel, a touchscreen display, a microphone, and/or another device configured to receive operator input, e.g., an instruction, a command, and/or another operating parameter for operating the machine 102 and/or the implement system 112. The output device 130 may include a display, a speaker, a haptic device, and/or another device configured to provide feedback to an operator, e.g., associated with an operating condition of the machine 102 and/or the implement system 112, a progress of an operation, a historic event associated with machine 102, a visual model and/or a map of a worksite, a target work path, and/or a target site plan.

The control device 124 includes one or more processors 132, one or more memories 134, and/or a communication component 136. The communication component 136 may enable the one or more processors 132 to exchange information with the training system 104, the user device 106, and/or the storage device 108. The control device 124 may communicate with the user device 106 and/or the storage device 108 directly and/or indirectly via the training system 104. In some examples, the control device 124 may be, may include, or may be included in, a control module, e.g., an engine control unit (ECU) or engine control module (ECM) of the machine 102.

As shown in FIG. 1, the training system 104 may include one or more processors 138, one or more memories 140, and a communication component 142. The communication component 142 may enable the one or more processors 138 to exchange information with the control device 124 of machine 102, the user device 106, and/or the storage device 108. The user device 106 may include one or more processor 144, one or more memories 146, a communication component 148, and a user interface 150. The user interface 150 may include an input device and/or an output device. The user interface 150 may include a display screen, a touch screen, a light-emitting diode (LED) display, an electroluminescent display (ELD), a plasma display panel (PDP), a liquid crystal display (LCD), an organic light-emitting diode (OLED) display, and/or another type of display screen. The user device 106 may include one or more components configured to capture or obtain image data, such as a camera. The communication component 148 may enable the one or more processors 144 to exchange information with the control device 124 of the machine 102, the training system 104, and/or the storage device 108. In some examples, the user device 106 may communicate with the control device 124 and/or the storage device 108 directly and/or indirectly via the training system 104. Additionally, or alternatively, the user device 106 may serve as a user interface of the training system 104.

A processor, e.g., the one or more processors 132, the one or more processors 138, and/or the one or more processors 144, may include a central processing unit, a graphics processing unit, a microprocessor, a controller, a microcontroller, a digital signal processor, a field-programmable gate array, an application-specific integrated circuit, and/or another type of processing component. A processor may be implemented in hardware, firmware, or a combination of hardware and software. In some implementations, the processor may include one or more processors capable of being programmed to perform one or more operations or processes described elsewhere herein.

A memory, e.g., the one or more memories 134, the one or more memories 140, and/or the one or more memories 146, may include volatile and/or nonvolatile memory. For example, the memory may include random access memory (RAM), read only memory (ROM), a hard disk drive, and/or another type of memory, e.g., a flash memory, a magnetic memory, and/or an optical memory. The memory may include internal memory, e.g., RAM, ROM, or a hard disk drive, and/or removable memory, e.g., removable via a universal serial bus connection. The memory may be a non-transitory computer-readable medium. The memory may store information, one or more instructions, and/or software, e.g., one or more software applications, related to the operation of the system 100. In some implementations, the memory may include one or more memories that are coupled, e.g., communicatively coupled, to one or more processors, such as via a bus. Communicative coupling between a processor and a memory may enable the processor to read and/or process information stored in the memory and/or to store information in the memory. A communication component, e.g., the communication component 136, the communication component 142, and/or the communication component 148, may enable a device or system to communicate with other devices or systems via a wired connection and/or a wireless connection. For example, a communication component may include a receiver, a transmitter, a transceiver, a modem, a network interface card, and/or an antenna, among other examples.

A device or system, e.g., the system 100, the training system 104, the user device 106, and/or the control device 124, may perform one or more operations or processes described herein. For example, a non-transitory computer-readable medium, e.g., one or more memories, may store a set of instructions, e.g., one or more instructions or code, for execution by one or more processors. The one or more processors may execute the set of instructions to perform one or more operations or processes described herein. In some implementations, execution of the set of instructions, by one or more processors, causes the one or more processors and/or the device or system to perform one or more operations or processes described herein. In some implementations, hardwired circuitry may be used instead of or in combination with the instructions to perform one or more operations or processes described herein. Additionally, or alternatively, the one or more processors may be configured to perform one or more operations or processes described herein. Thus, implementations described herein are not limited to any specific combination of hardware circuitry and software.

As indicated above, FIG. 1 is provided as an example. Other examples may differ from what is described with regard to FIG. 1.

Figure 2:
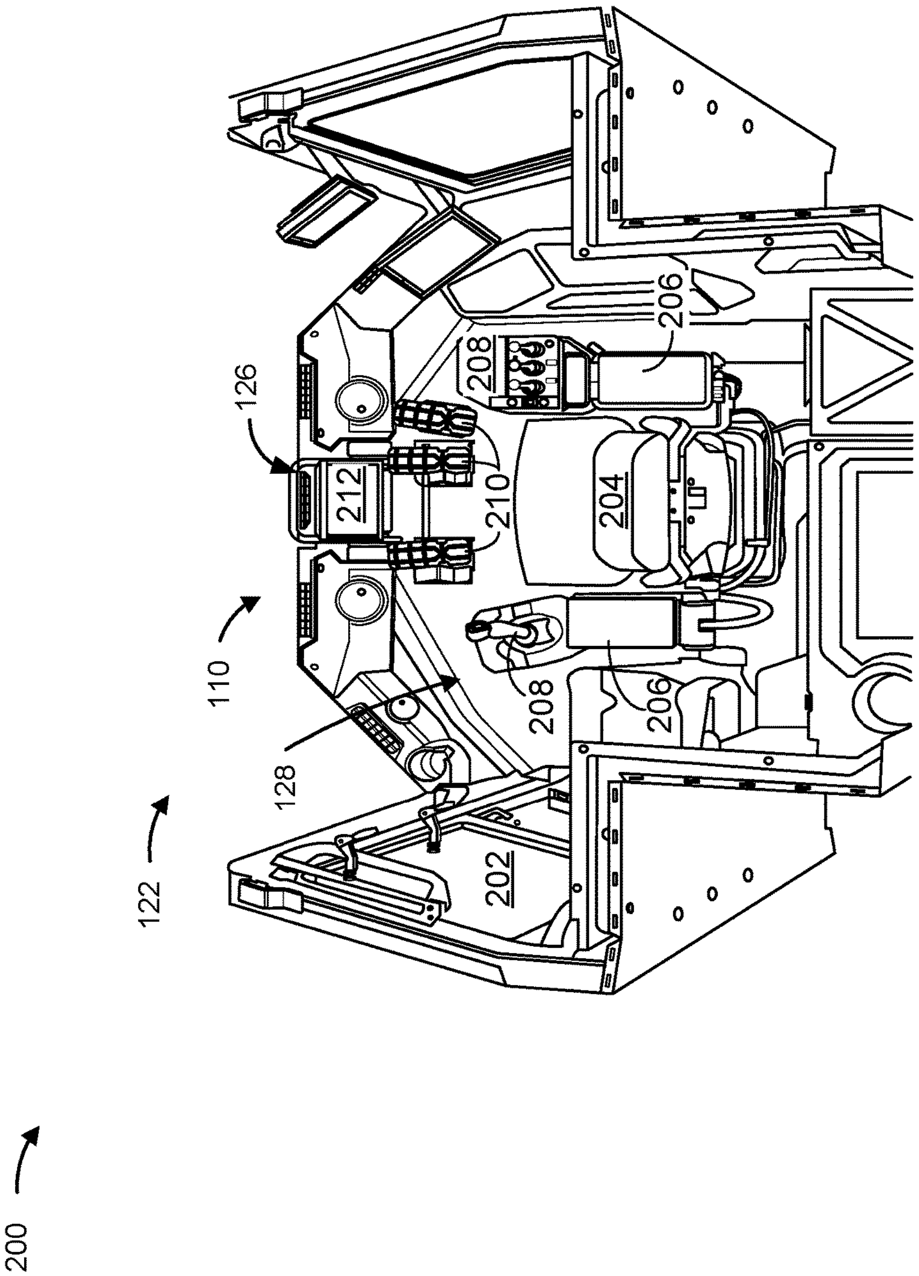
FIG. 2 is a diagram of an example of control components of a machine described herein.

FIG. 2 is a diagram of an example 200 of control components 110 of a machine 102 described herein. For example, FIG. 2 depicts an interior of an operator cab 122. As shown in FIG. 2, the interior of the operator cab 122 may include one or more control components 110, a control dashboard 126, and/or one or more input devices 128. It should be understood that the arrangement, configuration, location, quantity, and/or types of components depicted in FIG. 2 are provided as an example. The techniques and implementations described herein are similarly applicable to other arrangements, configurations, locations of components, quantities, and/or types of components for control components 110 of a machine 102.

As shown in FIG. 2, the operator cab 122 may include an entryway 202, a seat 204, an arm rest 206, one or more control levers 208, a pedal 210, and/or a display 212, among other examples. The entryway 202 is disposed at a side of the operator cab 122 and configured to allow an operator to enter or exit the operator cab 122. The seat 204 is disposed within the operator cab 122 and configured to support an operator during operation of machine 102.

A control lever 208 may be disposed on the arm rest 206 and includes a steering control lever, an implement control lever, and/or another type of input device 128 of the machine 102. The control lever 208 may be configured to be manipulated, handled, and/or otherwise used by the operator to control a function of machine 102. In some examples, the control lever 208 may be a joystick, a control knob, a dial, a wheel, a touchscreen display, and/or another type of input device 128 or control component 110 of machine 102. The pedal 210 is positioned relative to a floor of the operator cab 122 and/or the seat 204 and includes a brake control pedal, a torque control pedal, a throttle control pedal, a clutch pedal, and/or another type of input device 128 of machine 102. The pedal 210 may be configured to be depressed and/or otherwise used by the operator to control a braking function, a torque control function, a propulsion function, a gear change function, and/or another type of function of machine 102. For example, the pedal 210 may be in operative communication with the traction elements 118, the propulsion system 120, a transmission, a braking system, and/or another component of the machine 102.

The display 212 may be disposed within the operator cab 122 and may include an LED display, an ELD, a PDP, an LCD display, an OLED display, and/or another type of output device 130 of machine 102. The display 212 may be configured to display information to an operator, e.g., an operating condition of machine 102, a progress of an operation, a historic event associated with machine 102, a visual model and/or a map of a worksite, a target work path, and/or a target site plan. Additionally, or alternatively, the display 212 may include a touchscreen display configured to receive a gesture from the operator and serve as another type of input device 128 of machine 102. In some examples, the operator cab 122 may include a speaker, a haptic device, and/or another type of output device 130.

As indicated above, FIG. 2 is provided as an example. Other examples may differ from what is described with regard to FIG. 2.

Figure 3:
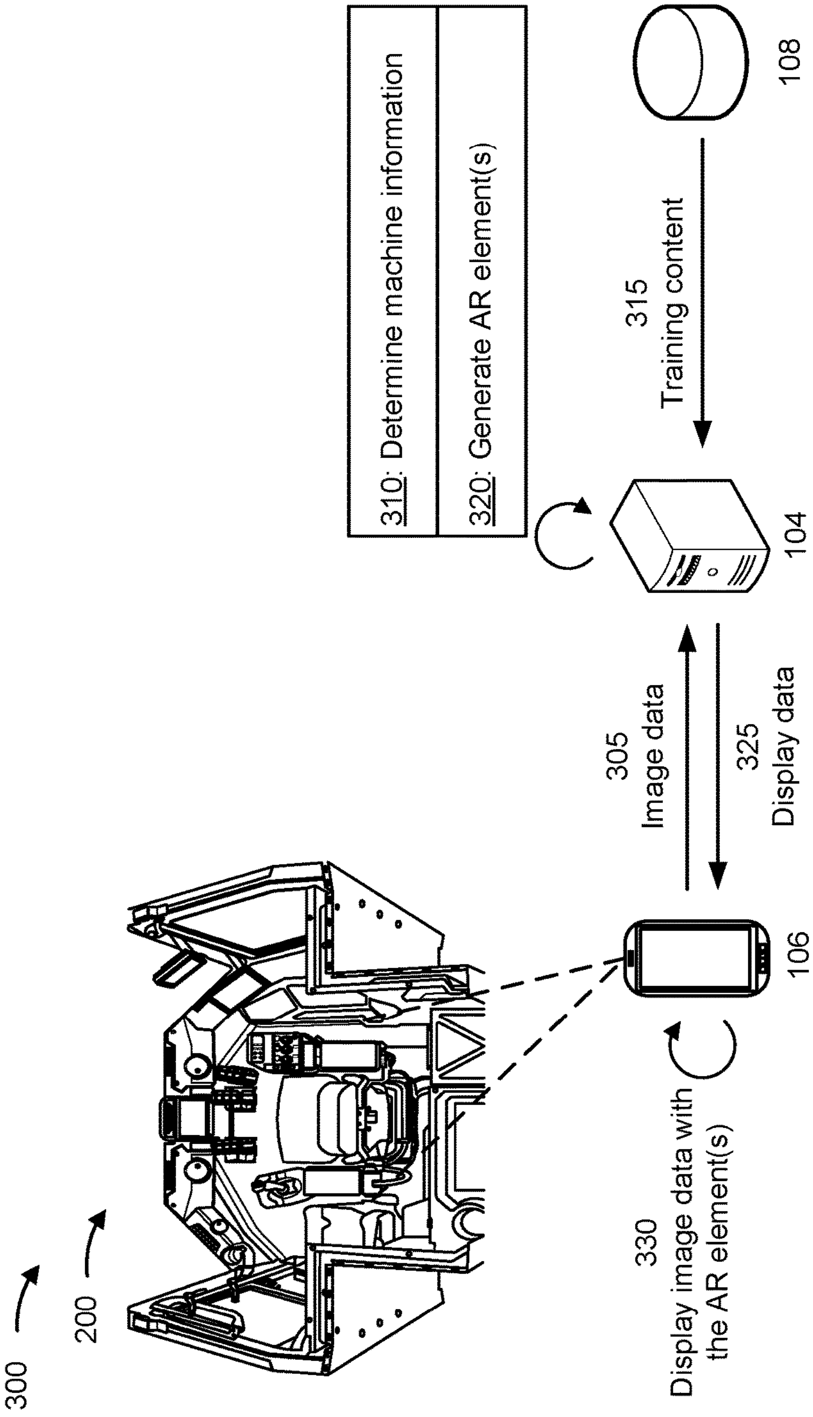
FIG. 3 is a diagram of an example of AR-based machine control training and operation described herein.

FIG. 3 is a diagram of an example 300 of AR-based machine control training and operation described herein. For example, as described herein, the user device 106 may capture images and/or video of the one or more control components 110 of a machine 102 to enable the training system 104 to provide AR-based training content that is particular to the one or more control components 110 included in the images and/or video.

For example, as shown in FIG. 3, the user device 106 may capture image data. The image data may include one or more images, one or more frames, a feed of image data, video data, and/or other image data. The user device 106 may capture the image data via a camera or other component of the user device 106. In some implementations, the image data may be provided to an application executing on the user device 106. For example, the application may be a training application for the machine 102. The training application may be associated with, e.g., controlled by, configured by, or otherwise managed by, the training system 104. For example, an operator may use the user device 106 to log in or launch, e.g., execute, the training application via the user device 106. The user device 106 may obtain an input for the operator, e.g., via the application and/or via a camera application, to capture the image data. As an example, the operator may point or direct the camera of the user device 106 toward one or more control components 110 of the machine 102.

As shown by reference number 305, the user device 106 may provide, and the training system 104 may obtain, the image data. For example, the training system 104 may obtain the image data via the application executing on the user device 106. As shown by reference number 310, the training system 104 may determine machine information associated with the machine based on the image data. For example, the training system 104 may process the image data to determine the machine information.

The image data may be associated with, or may depict, an environment of the machine 102. As used herein, "environment" of the machine 102 may refer to an area in which at least one control component of the machine 102 is located. For example, the environment may be an interior of the machine 102 and/or an exterior of the machine 102. In some examples, the environment may be remote from the machine 102, such as when the machine 102 is remotely operated. The environment may include the operator cab 122, an operator enclosure, a cabin, a control cab, a cockpit, an operator station, an operator compartment, a pilot house, and/or a driver's compartment, among other examples. For example, the environment may include an area that include at least one of a seat, a dashboard, a console, seat mounted controls, a display, a heads-up-display (HUD), a joystick, a steering wheel, at least one steering wheel mounted control, at least one control component 110, and/or at least one input device 128, among other examples. An example environment of the machine 102 is depicted in FIG. 2.

The machine information may include a machine type associated with the machine 102. For example, the training system 104 may process the image data to detect one or more identifiers indicating a type of machine being depicted in the image data. As an example, the training system 104 may determine a layout, configuration, and/or placement, among other examples, of one or more control components 110 being depicted in the image data. The training system 104 may use the information associated with the one or more control components 110, e.g., the layout, configuration, and/or placement, to determine the machine type associated with the machine 102 being depicted in the image data. For example, different machines may have different layouts of operator cabs 122 and/or control components 110. The training system 104 may be trained to detect and/or identify the machine type based on the layout of the operator cab 122 and/or placement of control components 110 as depicted in the image data.

Additionally, or alternatively, the machine information may include one or more control components 110 being depicted in the image data. For example, the training system 104 may detect one or more components, e.g., control components 110, depicted in the image data that are used to move, maneuver, or otherwise control the machine 102 or an implement 114 of the machine 102. The training system 104 may determine types of respective control components 110 depicted in the image data. For example, the training system 104 may be configured to detect control component types and/or corresponding functions, e.g., the training system 104 may determine, by processing the image data, a function that can be controlled using a control component 110 depicted in the image data.

As an example, the training system 104 may use a machine learning model to process the image data and/or to determine the machine information. The machine learning model may be a computer vision model, an object detection model, e.g., a you only look once (YOLO) model, and/or another type of model. For example, the machine learning model may be trained using data sets of images of respective machine types. For example, the training system 104 may perform preprocessing of the image data to standardize the image data for input to the machine learning model, e.g., to resize the image data to a fixed size, to normalize pixel values, and/or to augment the image data. The training system 104 may perform feature extraction to extract one or more features from the image data. For example, the training system 104 may input the, preprocessed, image data to a convolutional neural network (CNN) or another deep learning architecture configured for feature extraction. The machine learning model, e.g., the CNN, may include multiple layers of convolutional, activation, and/or pooling operations that extract hierarchical features from the image data. Features extracted from earlier layers may represent low-level visual patterns, such as and textures. Deeper layers may capture high-level semantic features relevant to object recognition.

After performing feature extraction, the machine learning model may generate one or more candidate regions, or bounding boxes, that are likely to include objects of interest, e.g., control components 110 or input devices 128. For example, the machine learning model may generate the one or more candidate regions using a selective search operation or a region proposal network. The machine learning model may input each candidate region into a CNN or other deep learning architecture to extract features specific to that candidate region. The machine learning model may use the extracted features for object classification and/or localization. For example, the machine learning model may be configured to determine a class probability, e.g., indicating a likelihood that an object is associated with a given class, such as a type of control component 110, for each detected object in the image data.

An output of the machine learning model may include, or indicate, the machine information. For example, an output of the machine learning model may be a class of machine depicted in the image data. The class of machine may indicate the machine type of the machine 102 depicted in the image data. Additionally, the output of the machine learning model may include a list of one or more detected objects. The detected objects may be control components 110, or input devices 128, depicted in the image data. For example, the machine learning model may be trained to detect control components 110, or input devices 128, depicted in image data. The output of the machine learning model may indicate the one or more detected control components 110, or input devices 128, and corresponding class labels, e.g., indicating types or classes of respective control components 110 detected in the image data, and bounding box coordinates, e.g., indicating locations of respective control components 110 detected in the image data.

As shown by reference number 315, the training system 104 may obtain training content. For example, the training system 104 may obtain the training content via the storage device 108. For example, the storage device 108 may store training content for different types of machines. As an example, the storage device 108 may store training manuals for respective types of machines. Training manual may also be referred to as an operating manual. For example, the training content may include a training manual associated with the machine 102 depicted in the image data. A training manual may include one or more tutorials associated with performing one or more functions of the machine 102. The training system 104 may obtain training content for one or more types of machines, e.g., prior to obtaining the image data. For example, the training system 104 may be initialized with training content for one or more types of machines. In other examples, the training system 104 may obtain the training content based on, or in response to, obtaining the image data.

The training content may include one or more files, one or more repositories, and/or one or more platforms, among other examples. For example, the training content may include one or more text files, one or more video files, and/or one or more images, among other examples. The training system 104 may obtain training content based on the machine information. For example, the training system 104 may determine the training content based on the machine information. The training system 104 may determine training content that is relevant to the machine information. For example, the training system 104 may determine or identify, from a set of training content, the training content that is associated with the type of machine depicted in the image data. Additionally, or alternatively, the training system 104 may determine or identify, from a set of training content, the training content that is associated with one or more control components 110 depicted in the image data.

The training content may include one or more tutorials for performing operations of the machine 102. For example, as described herein, the training content may enable an operator to learn one or more operations or functions of the machine 102 via intuition. Intuition refers to a scenario where the operations learns by themselves, such as via the training content, as contrasted from tuition which refers to a scenario where another person or entity teaches the operator.

For example, the training system 104 may search a training manual for information associated with the one or more control components 110 depicted in the image data and/or associated with a function of the machine 102 controlled by the one or more control components 110 depicted in the image data. The training system 104 may extract or otherwise obtain the information, e.g., training information, that is relevant to the one or more control components 110 depicted in the image data.

In some implementations, the training system 104 may determine, based on the image data, and/or the output of the machine learning model, a control configuration of the machine 102 or the one or more control components 110 depicted in the image data. The control configuration may be an arrangement, location, and/or type of control components 110 or functions associated with the machine 102. The training system 104 may determine, based on the control configuration, the training content. For example, the training system 104 may determine or identify training content that is specific to, or relevant to, the control configuration of the machine 102 or the one or more control components 110 depicted in the image data.

As shown by reference number 320, the training system 104 may generate one or more AR elements. The one or more AR elements may be associated with respective control components 110 depicted in the image data. The one or more AR elements may include wisdom boxes, annotations, e.g., text labels or captions to provide an indication of a control component 110 and/or training information for the control component 110, 3D models, animations, heads-up display (HUD) elements, markers, tracking images, virtual control elements, information panels, e.g., panels or windows displaying training information, from the training content, for a control component 110, interactive widgets, and/or information cards, among other examples.

For example, the training system 104 may obtain training information, from the training content, e.g., from a training manual of the machine 102, that is associated with or relevant to a given control component 110 detected in the image data. The training system 104 may generate an AR element for the given control component 110. The training system 104 may generate the AR element such that the training information is accessible via the AR element. For example, the AR element may be a wisdom box. A wisdom box may be a digital interface or overlay that provides contextual information, guidance, or assistance relative to an AR experience. For example, a wisdom box may include an information overlay, e.g., presenting textual or graphical information in a particular area or location. The training system 104 may generate the information overlay to indicate a name of the given control component 110, a function of the given control component 110, and/or other information for the given control component 110, such as an intended functionality or operation of the given control component 110 or an unintended functionality or operation of the given control component 110. For example, the wisdom box may depict one or more images indicating operational behavior, e.g., intended behavior or unintended behavior, of the one or more control components. As another example, a wisdom box may depict one or more videos indicating the operational behavior. As another example, a wisdom box may be associated with an audio output indicating the operational behavior.

A wisdom box may include contextual guidance. The contextual guidance may indicate instructions to an operator as the operator interacts with AR elements or objects in an AR environment. For example, the contextual guidance may indicate instructions, e.g., as indicated by the training information associated with the given control component 110, as to the intended functionality or operation of the given control component 110.

The wisdom box may include one or more accessibility features, such as a text-to-speech function, a language translation function, and/or an element to access further training information for the given control component 110. For example, the wisdom box may include an element that is selectable to enable the user device 106 to navigate to particular information or content, e.g., the training information, within the training manual associated with the machine 102. The training system 104 may generate AR elements for each control component 110 depicted or detected in the image data in a similar manner.

The training system 104 may overlay or insert the one or more AR elements into the image data. For example, the output of the machine learning model may include bounding box coordinates for respective control components detected in the image data. The training system 104 may insert an AR element, for a given control component 110, using the bounding box coordinates for the given control component 110. For example, the AR element may be overlayed or inserted into the image data proximate to, e.g., near or within a threshold quantity of pixel from, the bounding box coordinates for the given control component 110, such that the AR element is located close to the given control component 110 in the image data. The training system 104 may overlay or insert other AR elements in a similar manner.

As shown by reference number 325, the training system 104 may provide or transmit, and the user device 106 may obtain or receive, display data. The display data may include the image data with the one or more AR elements overlayed or inserted into the image data. For example, the training system 104 may provide or transmit the image data with the one or more AR elements overlayed in the image data, and information, e.g., training information, associated with the one or more control components 110 indicated by the training content, e.g., as indicated by the AR element(s). The training information may refer to information that is specific to, or relevant to, a given control component 110, whereas the training content may be relevant to all of the objects depicted in the image data, e.g., the training content may be, or include, a digital training manual for the machine 102 depicted in the image data.

As shown by reference number 330, the user device 106 may display AR content based on, or in response to, receiving the display data. For example, the user device 106 may display the image data with the one or more AR elements overlayed or inserted into the image data. The one or more AR elements may indicate, provide, or otherwise make accessible the training information for respective control components 110 depicted in the image data. For example, an AR element may include a textual label indicating textual training information, an element depicting visual training information, e.g., one or more images and/or one or more videos, an element configured to output audio training information, e.g., configured to cause the user device 106 to output the audio training information, and/or an element that is selectable, e.g., via user input, to cause the user device 106 to navigate to and/or display training information, among other examples, for a given control component 110 depicted in the image data.

As indicated above, FIG. 3 is provided as an example. Other examples may differ from what is described with regard to FIG. 3.

Figure 4:
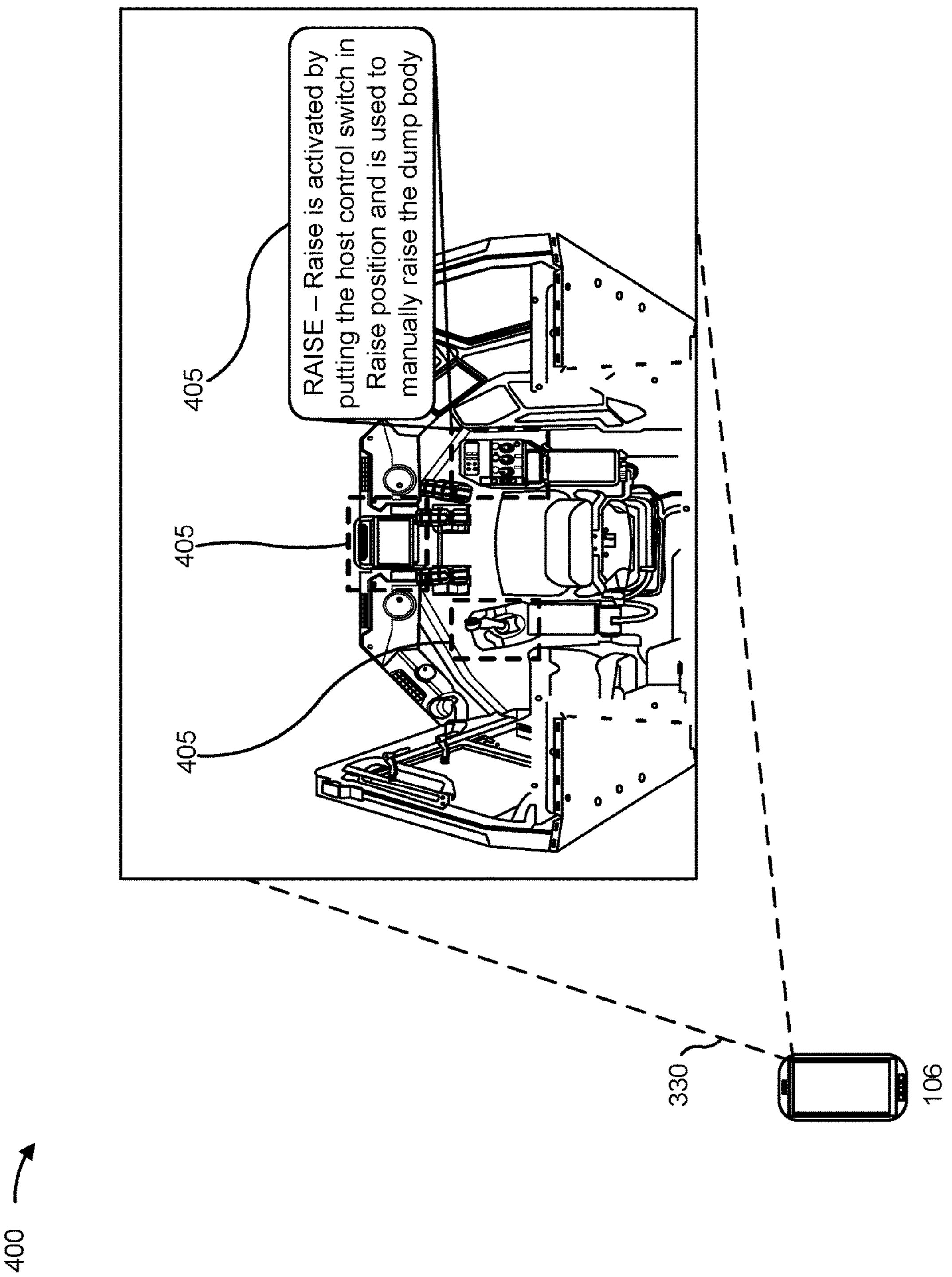
FIG. 4 is a diagram of an example an AR display for AR-based machine control training and operation described herein.

FIG. 4 is a diagram of an example an AR display 400 for AR-based machine control training and operation described herein. For example, as described in connection with FIG. 3 and reference number 330, the user device 106 may display AR content based on, or in response to, receiving the display data from the training system 104. An example of the AR content may be the AR display 400.

As shown in FIG. 4, the AR display 400 may include one or more AR elements 405. The one or more AR elements 405 may indicate, or identify, respective control components 110 depicted in the image data captured by the user device 106, as described elsewhere herein. Additionally, the one or more AR elements 405 may make training information accessible for respective control components 110. For example, as shown in FIG. 4, an AR element 405 for a host control switch, e.g., a given control component 110, may provide textual information indicating how the host control switch can be used to control a raise function of an implement 114 of the machine 102.

The one or more AR elements 405 may indicate training information in one or more manners. For example, an AR element 405 may include a textual element, an image element, e.g., indicating one or more images, a video element, e.g., indicating one or more videos, and/or an audio element, e.g., causing the user device to output audio, among other examples. In some examples, an AR element 405 may include an element that is selectable, e.g., via a user input to the user device 106. Selecting the AR element 405 may cause one or more elements, e.g., a textual element, an image element, a video element, an audio element, or another element, to be displayed via the user device 106. As another example, selecting the AR element 405 may cause the user device 106 to navigate to a page or portion of a digital training manual for the machine 102 that is associated with the control component 110, or function controlled by the control component 110, for with which the AR element 405 is associated.

As indicated above, FIG. 4 is provided as an example. Other examples may differ from what is described with regard to FIG. 4.

Figure 5:
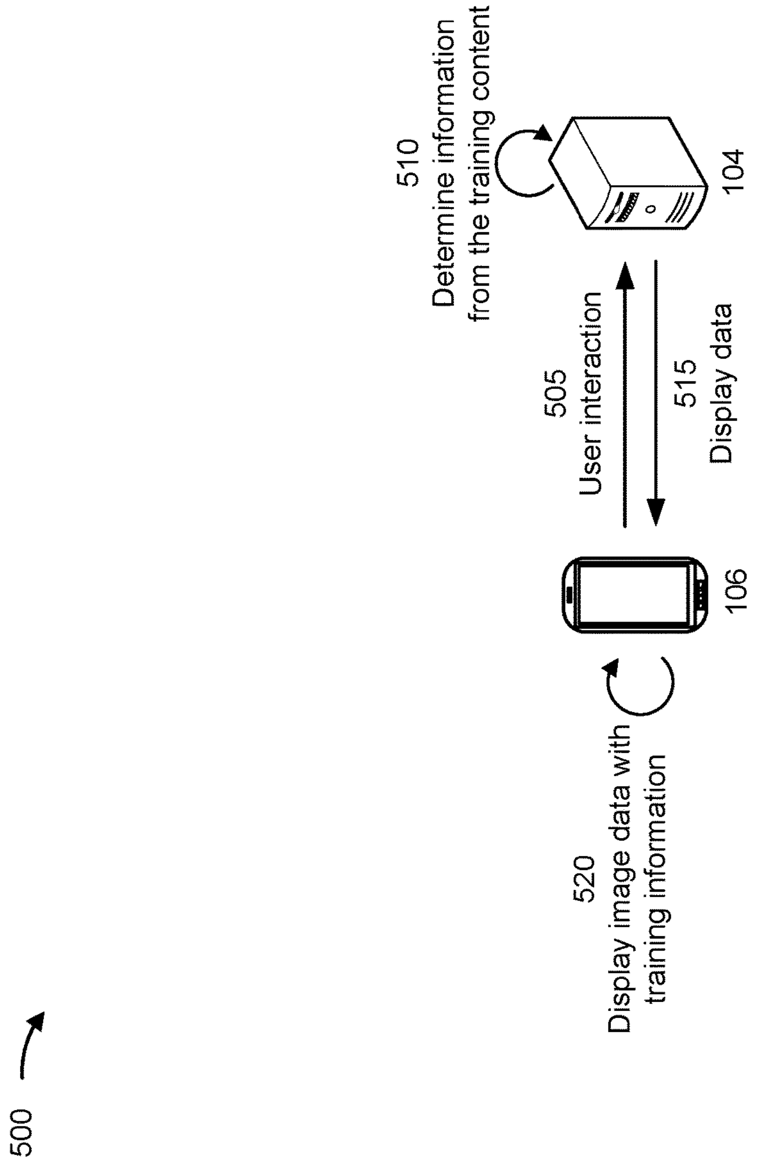
FIG. 5 is a diagram of an example of AR-based machine control training and operation described herein.

FIG. 5 is a diagram of an example 500 of AR-based machine control training and operation described herein. In some examples, the training system 104 may provide the AR content in connection with a training module or a training program. For example, the application executing on the user device 106 may be a training application for the machine 102. An operator may log in to the application using an operator identifier, e.g., to enable the user device 106 and/or the training system 104 to track or monitor a training progress for the operator. The operator may progress through a training module or a training program may interacting with one or more AR elements displayed via the user device 106, among other examples.

For example, the user device 106 may obtain a user input. The user input may be a touch input, a voice input, an input to a component of the user device 106, e.g., a button, a motion sensor input, e.g., a swipe or pinch, a gestural input, and/or a gaze input, e.g., the user device 106 may track a gaze of an operator and determine that the user input is associated with an AR element that the operator is looking at, among other examples. The user input may be associated with selecting an AR element. In some examples, the user input may cause the user device 106 to display information, e.g., text, an image, a video, and/or output information, e.g., audio. As another example, the user input may cause the user device 106 to navigate to a page, e.g., a web page or a page of the application, or open a file to display information, e.g., training information, that is specific to, or relevant to, a control component 110 associated with an AR element that was selected via the user input. The user input and/or the action performed by the user device 106 based on the user input may be referred to herein as a "user interaction."

In some examples, as shown by reference number 505, the user device 106 may transmit or provide, and the training system 104 may receive or obtain, an indication of one or more user interactions. The training system 104 may determine a progress for an operator identifier for a training module and/or training program based on the one or more user interactions. For example, to complete a training module and/or training program, the operator identifier may be associated with user interactions for each AR element and/or all training information for that training module and/or the training program. The training system 104 may maintain a progress of the operator identifier for one or more training modules and/or one or more training programs, e.g., indicating whether there have been user interactions with each AR element and/or all training information.

A user interaction may be indicative of whether an operator has ingested and/or understood training content presented via the user device 106. For example, a user interaction may indicate confirmation by the operator that the operator has viewed, listened to, or otherwise ingested the training content and understands the training content. A user interaction may include an interaction with a user interface, such as a user interface of the user device 106 and/or a user interface of the machine 102. As another example, a user interaction may include performing one or more actions or functions using the physical machine 102, such as performing an action or function that is presented for training by a training module, as described elsewhere herein. As another example, a user interaction may include providing an input to a component of the machine 102, such as an input device 128.

As shown by reference number 510, the training system 104 may determine information from the training content based on a user interaction. For example, the user interaction may indicate that an operator has selected a given AR element via the user device 106. The training system 104 may obtain training information, from the training content, e.g., from the digital training manual, that is associated with a control component 110 and/or a function that is associated with the given AR element. The training system 104 may generate one or more AR elements to make the training information accessible, in a similar manner as described elsewhere herein.

As shown by reference number 515, the training system 104 may transmit or provide, and the user device 106 may receive or obtain, display data indicating the training information and/or one or more AR elements, e.g., in a similar manner as described elsewhere herein. As shown by reference number 520, the user device 106 may display image data with the training information, e.g., with one or more AR elements via which the training information is accessible. In this way, an operator may interact with the user device 106 to obtain further training information for specific control components 110 that are depicted via the image data.

As indicated above, FIG. 5 is provided as an example. Other examples may differ from what is described with regard to FIG. 5.

Figure 6:
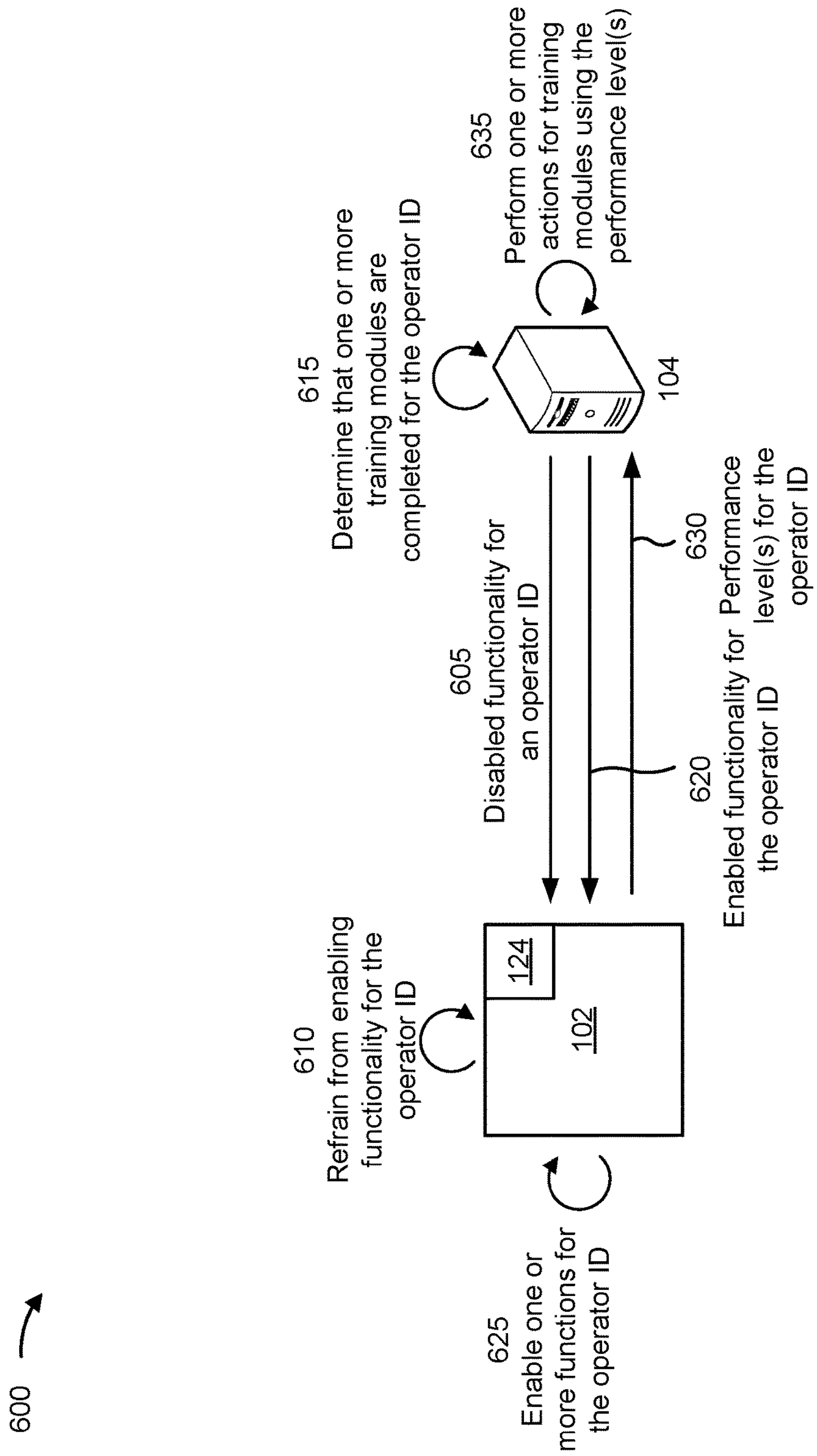
FIG. 6 is a diagram of an example of AR-based machine control training and operation described herein.

FIG. 6 is a diagram of an example 600 of AR-based machine control training and operation described herein. As shown in FIG. 6, the training system 104 may perform an action associated with enabling or disabling functionality of the machine 102 based on one or more user interactions with the training module or the training program via the user device 106.

For example, the training system 104 may transmit, and the control device 124 may receive, an indication of whether an operator identifier is enabled to operate the machine 102 or perform the functionality via the machine 102 based on the one or more user interactions indicating that the training module or training program has been completed via the user device 106, as described elsewhere herein. For example, as shown by reference number 605, the training system 104 may transmit, and the control device 124 may receive, an indication of disabled functionality for the operator identifier, e.g., based on the one or more user interactions indicating that the training module or training program has not been completed. For example, the training system 104 may transmit an indication that an operator identifier is not permitted to operate the machine 102 or perform the functionality to cause the functionality of the machine 102 to be disabled for the operator identifier.

The disabled functionality may be all functionality of the machine 102, e.g., the operator may not be permitted to operate the machine 102 until all training modules or training programs have been completed. As another example, the disabled functionality may be one or more functions that are associated with respective training modules. For example, a training module may be associated with training an operator to perform a given function of the machine 102. The training system 104 may cause the machine 102 to disable the given function, and enable other functions, until the training module has been completed in association with the operator identifier.

As shown by reference number 610, the machine 102, and/or the control device 124, may refrain from enabling the functionality, e.g., the disabled functionality, for the operator identifier. For example, when starting or powering on the machine 102, an operator may input an operator identifier. The machine 102 and/or the control device 124 may not allow any operation or functionality to be performed until an operator identifier is input. The control device 124 may determine or identify disabled functionality for the input, e.g., as indicated or configured by the training system 104. The control device 124 may disable the indicated disabled functionality for the operator identifier.

As shown by reference number 615, the training system 104 may determine that one or more training modules are completed for the operator identifier. For example, the training system 104 may obtain an indication of one or more user interactions via the user device 106 that indicate that the one or more training modules have been completed. The training system 104 may identify one or more functions associated with the one or more training modules.

As shown by reference number 620, the training system 104 may transmit, and the control device 124 may receive, an indication of enabled functionality for the operator identifier. For example, the training system 104 may transmit, and the control device 124 may receive, an indication that the operator identifier is enabled to operate the machine 102 or perform the functionality, e.g., the one or more functions, via the machine 102 based on the one or more user interactions indicating that the one or more training modules have been completed. As shown by reference number 625, the control device 124 may enable the indicated functionality for the operator identifier. In this way, the training system 104 may ensure that an operator associated with the operator identifier is only enabled to operate the actual machine 102 after completing training, e.g., via the AR-based training described herein.

In some examples, as shown by reference number 630, the machine 102, e.g., the control device 124, may transmit, and the training system 104 may receive, one or more performance levels for the operator identifier. For example, the training system 104 may receive an indication of a performance score for the functionality of the machine 102. The performance score may be associated with the operator identifier that is associated with the one or more user interactions or the user device 106. The performance score may indicate a level of performance of the machine 102 for the functionality. For example, the control device 124 may determine the performance score or the performance level based on actual operation of the machine 102, e.g., using one or more metrics and/or configured intended operation for one or more functions. For example, if an actual operation of the machine 102 differs from the intended operation for a given function, then the control device 124 may determine a performance score for the given function that indicates a lower performance level. If the actual operation of the machine 102 is close to the intended operation for a given function, then the control device 124 may determine a performance score for the given function that indicates a higher performance level.

As shown by reference number 635, the training system 104 may perform one or more actions for one or more training modules using the indicated performance levels and/or performance scores. For example, the training system 104 may determine, based on a performance score, that a training module is to be completed for the operator identifier, e.g., after the training module was previously completed. Additionally, the training system 104 may cause functionality, e.g., all functionality or functionality associated with the training module, to be disabled for the operator identifier until the training module has been completed for the operator identifier, as described herein. In this way, the machine 102 may provide feedback indicating whether a given operator has been properly trained. The training system 104 may control training and/or operation of the machine 102 for the given operator based on, or using, the feedback.

As indicated above, FIG. 6 is provided as an example. Other examples may differ from what is described with regard to FIG. 6.

Figure 7:
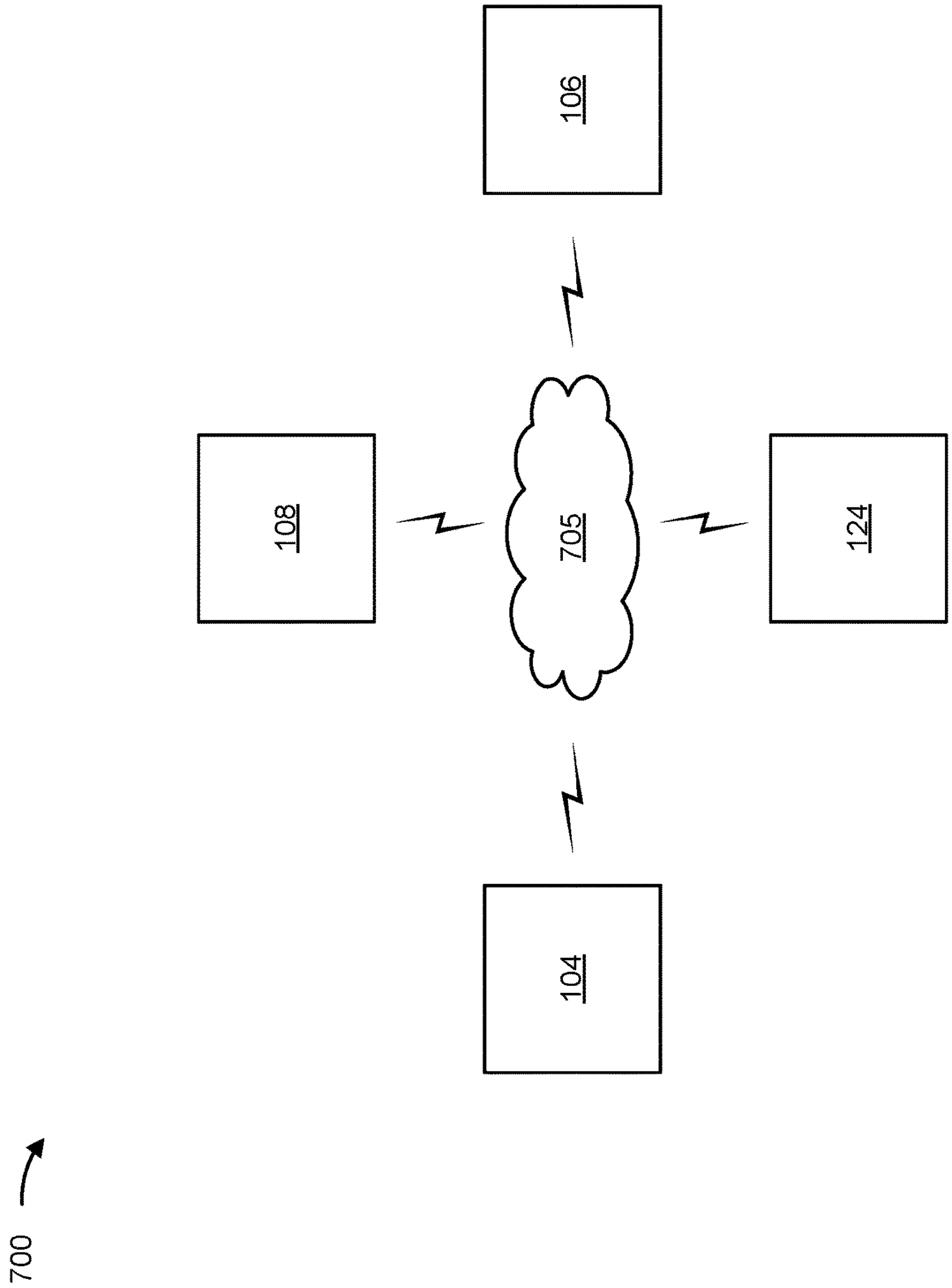
FIG. 7 is a diagram of an example environment in which systems and/or methods described herein may be implemented.

FIG. 7 is a diagram of an example environment 700 in which systems and/or methods described herein may be implemented. As shown in FIG. 7, environment 700 may include the training system 104, the user device 106, the storage device 108, the control device 124, e.g., of the machine 102, and a network 705. Devices of environment 700 may interconnect via wired connections, wireless connections, or a combination of wired and wireless connections.

The training system 104 may include one or more devices capable of receiving, generating, storing, processing, providing, and/or routing information associated with AR-based machine control training and operation, as described elsewhere herein. The training system 104 may include a communication device and/or a computing device. For example, the training system 104 may include a server, such as an application server, a client server, a web server, a database server, a host server, a proxy server, a virtual server, e.g., executing on computing hardware, or a server in a cloud computing system. In some implementations, the training system 104 may include computing hardware used in a cloud computing environment. The training system 104 may be included in the machine 102 and/or the control device 124. The training system 104 may be included in the user device 106.

The user device 106 may include one or more devices capable of receiving, generating, storing, processing, and/or providing information associated with AR-based machine control training and operation, as described elsewhere herein. The user device 106 may include a communication device and/or a computing device. For example, the user device 106 may include a wireless communication device, a mobile phone, a user equipment, a laptop computer, a tablet computer, a wearable communication device, e.g., a smart wristwatch, a pair of smart eyeglasses, a head mounted display, or a virtual reality headset, or a similar type of device.

The storage device 108 may include one or more devices capable of receiving, generating, storing, processing, and/or providing information associated with AR-based machine control training and operation, as described elsewhere herein. The storage device 108 may include a communication device and/or a computing device. For example, the storage device 108 may include a data structure, a database, a data source, a server, a database server, an application server, a client server, a web server, a host server, a proxy server, a virtual server, e.g., executing on computing hardware, a server in a cloud computing system, a device that includes computing hardware used in a cloud computing environment, or a similar type of device. As an example, the storage device 108 may store training data, one or more training manuals, and/or other information associated with AR-based machine control training and operation for one or more machines 102, as described elsewhere herein.

The control device 124 may include one or more devices capable of receiving, generating, storing, processing, providing, and/or routing information associated with AR-based machine control training and operation, as described elsewhere herein. The control device 124 may include a communication device and/or a computing device. The control device 124 may be included in the machine 102, e.g., in a control module, such as an ECU or ECM, or may be remote from the machine 102. The control device 124 may include a server, such as an application server, a client server, a web server, a database server, a host server, a proxy server, a virtual server, e.g., executing on computing hardware, or a server in a cloud computing system. In some implementations, the control device 124 may include computing hardware used in a cloud computing environment.

The network 705 may include one or more wired and/or wireless networks. For example, the network 705 may include a wireless wide area network, e.g., a cellular network or a public land mobile network, a local area network, e.g., a wired local area network or a wireless local area network (WLAN), such as a Wi-Fi network, a personal area network, e.g., a Bluetooth network, a near-field communication network, a telephone network, a private network, the Internet, and/or a combination of these or other types of networks. The network 705 enables communication among the devices of environment 700.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices, e.g., one or more devices, of environment 700 may perform one or more functions described as being performed by another set of devices of environment 700.

Figure 8:
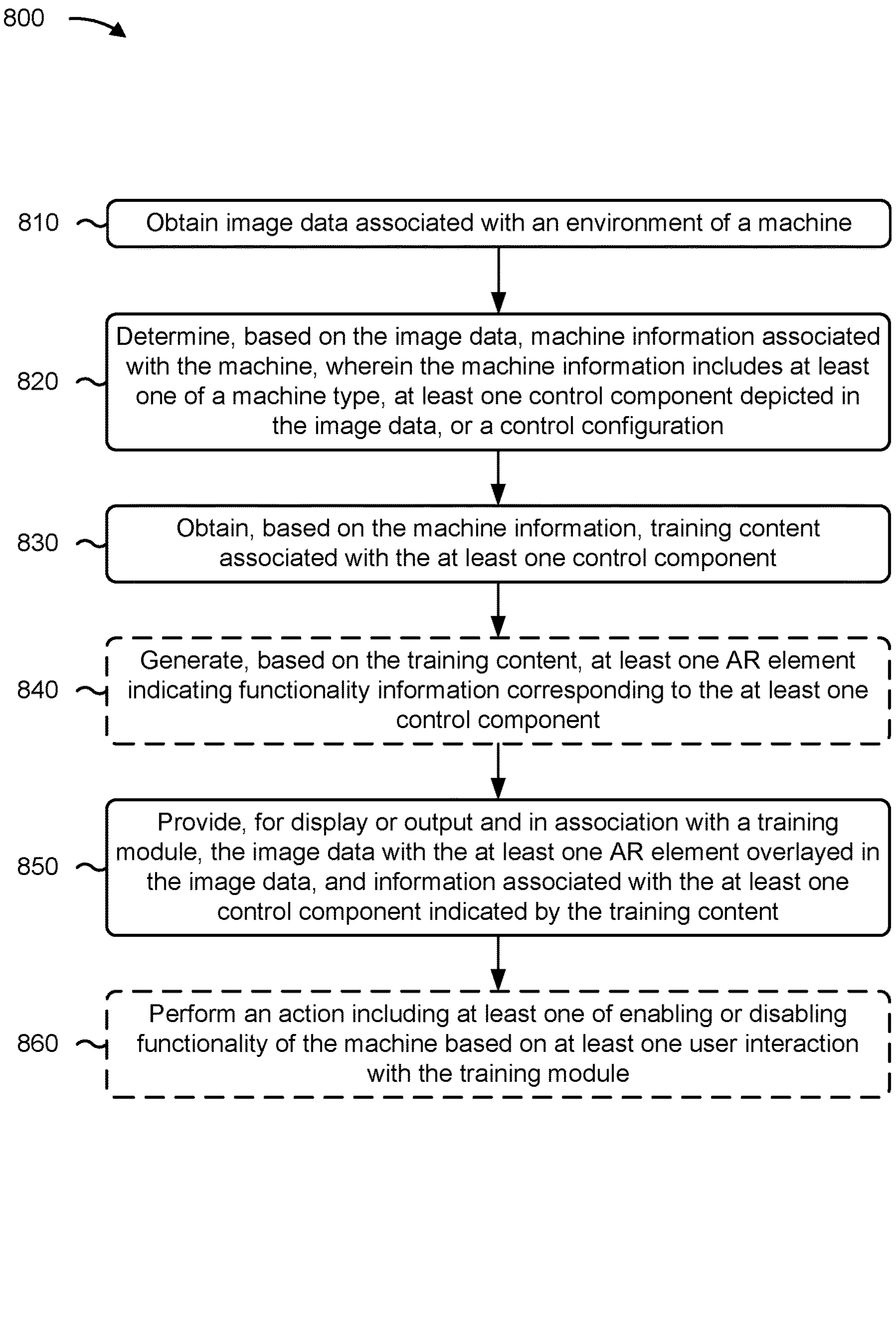
FIG. 8 is a flowchart of an example process associated with AR based machine control training and operation.

FIG. 8 is a flowchart of an example process 800 associated with AR-based machine control training and operation. One or more process blocks of FIG. 8 may be performed by a system, e.g., the system 100 and/or the training system 104. Additionally, or alternatively, one or more process blocks of FIG. 8 may be performed by another device or a group of devices separate from or including the system, such as another device or component that is internal or external to the training system 104.

As shown in FIG. 8, process 800 may include obtaining image data associated with an environment of a machine (block 810). For example, the system may obtain image data associated with an environment of a machine, as described above.

As further shown in FIG. 8, process 800 may include determining, based on the image data, machine information associated with the machine, wherein the machine information includes at least one of a machine type, at least one control component depicted in the image data, or a control configuration (block 820). For example, the system may determine, based on the image data, machine information associated with the machine, wherein the machine information includes at least one of a machine type, at least one control component depicted in the image data, or a control configuration, as described above. In some implementations, the machine information includes at least one of a machine type, at least one control component depicted in the image data, or a control configuration. In some implementations, determining the machine information includes detecting the at least one control component depicted in the image data using an object detection model that is trained using a data set of images that is associated with the machine type.

As further shown in FIG. 8, process 800 may include obtaining, based on the machine information, training content associated with the at least one control component (block 830). For example, the system may obtain, based on the machine information, training content associated with the at least one control component, as described above. Obtaining the training content may include obtaining, based on determining the machine information, a training manual associated with the machine, determining that the at least one control component depicted in the image data are associated with controlling one or more functions of the machine, and obtaining, from the training manual, the training content, where the training content is associated with the one or more functions of the machine.

As further shown in FIG. 8, process 800 may optionally include generating, based on the training content, at least one AR element indicating functionality information corresponding to the at least one control component (block 840). For example, the system may generate, based on the training content, at least one AR element indicating functionality information corresponding to the at least one control component, as described above.

As further shown in FIG. 8, process 800 may include providing, for display or output and in association with a training module, the image data with the at least one AR element overlayed in the image data, and information associated with the at least one control component indicated by the training content (block 850). For example, the system may provide, for display or output and in association with a training module, the image data with the at least one AR element overlayed in the image data, and information associated with the at least one control component indicated by the training content, as described above. The information associated with the at least one control component may include at least one of one or more images indicating operational behavior of the at least one control component, one or more videos indicating the operational behavior, or audio output indicating the operational behavior.

In some implementations, providing the image data with the at least one AR element overlayed in the image data and the information associated with the at least one control component indicated by the training content includes detecting a user interaction with an AR element of the at least one AR element, wherein the AR element is associated with indicating a control component of the at least one control component in the image data, and providing, for display or output and based on detecting the user interaction, content from the training content that is associated with the control component.

As further shown in FIG. 8, process 800 may optionally include performing, by the system, an action associated with enabling or disabling functionality of the machine based on at least one user interaction with the training module (block 860). In some implementations, performing the action comprises transmitting, to a control device of the machine, an indication of whether an operator identifier, such as an operator corresponding to the operator identifier, is permitted to operate the machine or perform the functionality via the machine based on the at least one user interaction indicating that the training module has been completed.

In some implementations, process 800 includes receiving, via a control device of the machine, an indication of a performance score for the functionality of the machine, wherein the performance score is associated with an operator identifier, and wherein the performance score indicates a level of performance of the machine for the functionality, determining, based on the performance score, that the training module is to be completed for the operator identifier, and causing the functionality to be disabled for the operator identifier until the training module has been completed for the operator identifier.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

INDUSTRIAL APPLICABILITY

In some examples, a device, such as a display screen in the machine or a user device, may display an operator manual for the machine. The operator manual may provide information on the functionalities, capabilities, intended operation, unintended operation, and/or other information for the machine or control components of the machine. However, because of the multitude of control components included in the machine and the many functionalities supported by the machine, the displayed operator manual may include a significant amount of information, pages, and/or sections. Therefore, the device, displaying the operator manual, may consume significant processing resources, computing resources, memory resource, and/or power resources, among other examples associated with navigating through different pages or menus of the operator manual, generating different pages of the operator manual, and/or presenting information for display, among other examples, associated with an operator searching through the operator manual for information relevant to a given control component and/or function of the machine.

Further, it may be difficult for a user to locate particular information of interest using the operator manual. For example, descriptions of a navigational menu may be unintuitive and/or the operator may need to click through navigational menus in multiple hierarchical levels in order to locate the information of interest. The difficulty to locate particular information of interest using the operator manual may increase a likelihood that the operator is unable to obtain information regarding the correct or intended operation of a given control component and/or function of the machine. This may increase a risk of damage to the machine, an implement of the machine, and/or an environment around the machine, among other examples, due to improper operation of the machine and/or a function of the machine. Additionally, it may be difficult to ensure that an operator has obtained the required information indicating the intended operation and/or the unintended operation of the control components and/or functions of the machine, for example to ensure that the operator has received proper training.

Some implementations described herein enable AR-based machine training and operation. A training system may obtain image data, such as a video feed, of a user device. The training system may detect one or more control components depicted in the image data. The training system may generate AR elements for respective control components depicted in the image data. The training system may provide, for display, via the user device, AR content, such as the image data with the AR elements overlayed or inserted. The AR elements may indicate training information for a control element corresponding to the AR element.

As a result, the training system may improve access to the training information for an operator of the user device. For example, by providing training information via an AR element placed at or near a control element being depicted in a video feed of a user device, relevant training information may be quickly accessible for an operator while the operator is in a real-world environment. This conserves processing resources, computing resources, memory resource, and/or power resources, among other examples that would have otherwise been associated with navigating through different pages or menus of the operator manual, generating different pages of the operator manual, and/or presenting information for display, among other examples, associated with an operator searching through the operator manual for information relevant to a given control component and/or function of the machine. Further, by providing the training information while the operator is in proximity to the actual, physical machine, training results may be improved, for example, as compared to virtual reality training or simulation training, thereby reducing the likelihood of damage to the machine that may have otherwise been caused due to incorrect or unintended operation.

Further, the training system may control access or performability of one or more functions of the machine. For example, the training system may cause the machine to restrict access to and/or to disable one or more functions of the machine until a training module or training program for the one or more functions has been completed in connection with an operator identifier of the operator. This improves the likelihood that an operator does not attempt to operate the physical machine until after completing training, thereby reducing the likelihood of damage to the machine that may have otherwise been caused due to incorrect or unintended operation.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor," "one or more processors," or "at least one processor", or another device or component, such as "a controller," "one or more controllers," or "at least one controller", is described or claimed, within a single claim or across multiple claims, as performing multiple operations or being configured to perform multiple operations, this language is intended to broadly cover a variety of processor architectures and environments. For example, unless explicitly claimed otherwise, e.g., via the use of "first processor" and "second processor" or other language that differentiates processors in the claims, this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "at least one processor configured to: perform X; perform Y; and perform Z," that claim should be interpreted to mean "one or more processors configured to perform X; one or more, possibly different, processors configured to perform Y; and one or more, also possibly different, processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." "One or more" may be used interchangeably with "at least one." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise, e.g., if used in combination with "either" or "only one of".

What is claimed is:

1. A system, comprising:
at least one processor; and
at least one memory coupled in communication with the at least one processor, the at least one memory storing instructions that, when executed by the at least one processor, cause the at least one processor to:
obtain, via a user device, image data associated with an environment of a machine;
determine, using a machine learning model and based on the image data, machine information associated with the machine,
wherein the machine information includes at least one of a machine type or at least one control component depicted in the image data;
determine, based on the machine information, a control configuration of the at least one control component that includes at least one of:
an arrangement of a plurality of control components including the at least one control component,
a structural type of the at least one control component, or
a function of the at least one control component for operating the machine;
determine, based on the control configuration, training content associated with at least one of the machine or the control component;
generate, based on the training content, at least one augmented reality (AR) element indicating functionality information corresponding to the at least one control component;
provide, for display or output via the user device and in association with a training module, the image data with the at least one AR element overlaid in the image data, and information associated with the at least one control component indicated by the training content; and
perform an action associated with enabling or disabling an operational function of the machine based on at least one user interaction with the training module.

2. The system of claim 1, wherein the instructions, that cause the at least one processor to obtain the training content, cause the at least one processor to:
obtain, based on determining the machine information, a manual associated with the machine;
determine that the at least one control component depicted in the image data is associated with controlling the operational function of the machine; and
obtain, from the manual, the training content,
wherein the training content enables training for an intended performance of the operational function of the machine.

3. The system of claim 1, wherein the instructions, that cause the at least one processor to perform the action, cause the at least one processor to:
transmit, to a control device of the machine and based on the at least one user interaction indicating that the training module has been completed, an indication that an operator, associated with the at least one user interaction or the user device, is permitted to operate the machine or perform the operational function of the machine.

4. The system of claim 1, wherein the instructions, that cause the at least one processor to perform the action, cause the at least one processor to:
transmit, to a control device of the machine and based on the at least one user interaction indicating that the training module has not been completed, an indication that an operator, associated with the at least one user interaction or the user device, is not permitted to operate the machine or perform the operational function of the machine.

5. The system of claim 1, wherein the instructions, that causes the at least one processor to provide the image data with the at least one AR element overlaid in the image data and the information associated with the at least one control component indicated by the training content, cause the at least one processor to:

detect, via the user device, a user interaction with an AR element of the at least one AR element, wherein the AR element is associated with indicating a control component of the at least one control component in the image data; and provide, for display or output via the user device and based on detecting the user interaction, a portion of the training content that is associated with the control component.

6. The system of claim 1, wherein the instructions further cause the at least one processor to:

receive, via a control device of the machine, an indication of a performance score for the operational function of the machine, wherein the performance score is associated with an operator that is associated with the at least one user interaction or the user device, and wherein the performance score indicates a level of performance of the machine for performing the operational function of the machine;

determine, based on the performance score, that the training module is to be completed for the operator; and disable the operational function of the machine for the operator until the training module has been completed.

7. The system of claim 1, wherein the structural type of the at least one control component comprises at least one of: a lever, a pedal, a joystick, a switch, a button, or a touch-screen interface.

8. A method, comprising:

obtaining, by a system, image data associated with an environment of a machine;

determining, by the system and based on the image data, machine information associated with the machine, wherein the machine information includes at least one of a machine type or at least one control component depicted in the image data;

determine, by the system and based on the machine information, a control configuration associated with the at least one control component that includes at least one of:

an arrangement of a plurality of control components including the at least one control component, a structural type of the at least one control component, or a function of the at least one control component for operating the machine;

determining, based on the control configuration, training content associated with the at least one of the machine or the control component;

generating, by the system and based on the training content, at least one augmented reality (AR) element indicating functionality information corresponding to the at least one control component; and providing, by the system and for display or output and in association with a training module, the image data with the at least one AR element overlaid in the image data, and information associated with the at least one control component indicated by the training content.

9. The method of claim 8, further comprising:

performing, by the system, an action including at least one of enabling or disabling an operational function of the machine based on at least one user interaction with the training module.

10. The method of claim 9, wherein performing the action comprises:

transmitting, to a control device of the machine and based on the at least one user interaction indicating that the training module has been completed, an indication of whether an operator, associated with the at least one user interaction, is permitted to operate the machine or perform the operational function of the machine.

11. The method of claim 8, wherein obtaining the training content comprises:

obtaining, based on determining the machine information, a manual associated with the machine;

determining that the at least one control component depicted in the image data is associated with controlling an operational function of the machine; and obtaining, from the manual, the training content, wherein the training content enables training for an intended performance of the operational function of the machine.

12. The method of claim 8, wherein the information associated with the at least one control component includes at least one of:

at least one image indicating operational behavior of the at least one control component, at least one video indicating the operational behavior, or audio output indicating the operational behavior.

13. The method of claim 8, wherein providing the image data with the at least one AR element overlaid in the image data and the information associated with the at least one control component indicated by the training content comprises:

detecting a user interaction with an AR element of the at least one AR element, wherein the AR element is associated with indicating a control component of the at least one control component in the image data; and providing, for display or output and based on detecting the user interaction, a portion of the training content that is associated with the control component.

14. The method of claim 8, wherein determining the machine information comprises:

detecting the at least one control component in the image data using an object detection model that is trained using a data set of images that is associated with the machine type.

15. The method of claim 8, further comprising:

receiving, via a control device of the machine, an indication of a performance score for an operational function of the machine, wherein the performance score is associated with an operator-, and wherein the performance score indicates a level of performance of the machine for performing the operational function of the machine;

determining, based on the performance score, that the training module is to be completed for the operator; and disabling the operational function for the operator until the training module has been completed.

16. A non-transitory computer-readable medium storing a set of instructions, the set of instructions comprising:

instructions that, when executed by at least one processor of a system, cause the system to:

obtain, via a user device, image data associated with an environment of a machine;

determine, using a machine learning model and based on the image data, machine information associated with the machine, wherein the machine information includes at least one of a machine type or at least one control component depicted in the image data;

determine, based on the machine information, a control configuration associated with the at least one control component that includes at least one of:

an arrangement of a plurality of control components including the at least one control component, a structural type of the at least one control component, or a function of the at least one control component for operating the machine;

determine, based on the control configuration, training content associated with the at least one of the machine or the control component;

generate, based on the training content, at least one augmented reality (AR) element indicating functionality information corresponding to the at least one control component;

provide, for display or output via the user device and in association with a training module, the image data with the at least one AR element overlaid in the image data, and information associated with the at least one control component indicated by the training content; and perform an action associated with enabling or disabling an operational function of the machine based on at least one user interaction with the training module.

17. The non-transitory computer-readable medium of claim 16, wherein the instructions, that cause the system to obtain the training content, cause the system to:

obtain, based on determining the machine information, a manual associated with the machine;

determine that the at least one control component depicted in the image data is associated with controlling the operational function of the machine; and obtain, from the manual, the training content, wherein the training content is associated with the operational function of the machine.

18. The non-transitory computer-readable medium of claim 16, wherein the instructions, that cause the system to perform the action, cause the system to:

transmit, to a control device of the machine and based on the at least one user interaction indicating that the training module has been completed, an indication that an operator, associated with the at least one user interaction or the user device, is permitted to operate the machine or perform the operational function of the machine.

19. The non-transitory computer-readable medium of claim 16, wherein the instructions, that cause the system to provide the image data with the at least one AR element overlaid in the image data and the information associated with the at least one control component indicated by the training content, cause the system to:

detect, via the user device, a user interaction with an AR element of the at least one AR element, wherein the AR element is associated with indicating a control component of the at least one control component in the image data; and provide, for display or output via the user device and based on detecting the user interaction, content from the training content that is associated with the control component.

20. The non-transitory computer-readable medium of claim 16, wherein the instructions further cause the system to:

receive, via a control device of the machine, an indication of a performance score for the operational function of the machine, wherein the performance score is associated with an operator that is associated with the at least one user interaction or the user device, and wherein the performance score indicates a level of performance of the machine for performing the operational function of the machine;

determine, based on the performance score, that the training module is to be completed for the operator; and cause the operational function of the machine to be disabled for the operator until the training module has been completed.

* * * * *